(12) United States Patent
Mitchell et al.

(10) Patent No.: US 8,494,369 B2
(45) Date of Patent: Jul. 23, 2013

(54) PLANAR LIGHTWAVE CIRCUIT

(75) Inventors: Matthew L. Mitchell, Monte Sereno, CA (US); Michael Van Leeuwen, Bethesda, MD (US)

(73) Assignee: Infinera Corporation, Sunnyvale, CA (US)

( * ) Notice: Subject to any disclaimer, the term of this patent is extended or adjusted under 35 U.S.C. 154(b) by 668 days.

(21) Appl. No.: 12/479,518

(22) Filed: Jun. 5, 2009

(65) Prior Publication Data

US 2010/0086307 A1    Apr. 8, 2010

Related U.S. Application Data

(60) Provisional application No. 61/059,676, filed on Jun. 6, 2008.

(51) Int. Cl.
*H04J 14/02* (2006.01)

(52) U.S. Cl.
USPC ............................................. 398/82; 398/94

(58) Field of Classification Search
USPC ....................................... 398/82, 94
See application file for complete search history.

(56) References Cited

U.S. PATENT DOCUMENTS

| | | | | |
|---|---|---|---|---|
| 6,157,475 A * | 12/2000 | Dugan et al. | ..................... | 398/26 |
| 6,208,454 B1 | 3/2001 | Koren et al. | | |
| 6,392,769 B1 * | 5/2002 | Ford et al. | ......................... | 398/9 |
| 6,466,715 B1 | 10/2002 | Akiba et al. | | |
| 6,597,833 B1 * | 7/2003 | Pi et al. | ............................ | 385/30 |
| 6,996,302 B2 * | 2/2006 | Hamada | ......................... | 385/14 |
| 7,570,845 B2 * | 8/2009 | Welch et al. | .................... | 385/14 |
| 2002/0080457 A1 | 6/2002 | Nakanishi et al. | | |
| 2003/0133641 A1 | 7/2003 | Yoo | | |
| 2003/0194184 A1 | 10/2003 | Carberry et al. | | |
| 2005/0129402 A1 | 6/2005 | Kim et al. | | |

FOREIGN PATENT DOCUMENTS

JP            09-074182         3/1997

* cited by examiner

*Primary Examiner* — Leslie Pascal
(74) *Attorney, Agent, or Firm* — David L. Soltz

(57) ABSTRACT

Consistent with the present disclosure optical interleaver and deinterleaver circuits are integrated onto a substrate. The inputs to the interleaver and the outputs of the deinterleaver are each coupled to a corresponding variable optical attenuator (VOA) and optical tap, which are also provided on the substrate. The optical taps supply a portion of the output of each VOA to a corresponding photodetector. A control circuit, which is coupled to the photodetector, in turn, supplies a control signal to each VOA based on the output of the photodetector. Accordingly, optical multiplexing and demultiplexing components, as well as monitoring and power regulating components are provided on the same chip. Such a chip may be compact, relatively inexpensive, and has reduced power consumption compared to optical multiplexer and demultiplexer equipment including discrete components.

15 Claims, 5 Drawing Sheets

PLANAR LIGHTWAVE CIRCUIT

This application claims the benefit under 35 U.S.C. §119 (e) of U.S. Provisional Patent Application No. 61/059,676, filed Jun. 6, 2008, the entire contents of which are incorporated herein by reference.

BACKGROUND

In a wavelength division multiplexed (WDM) optical communication system, multiple optical signals, each at a different wavelength, are typically combined onto an optical fiber. In order to multiplex these signals onto the fiber, various optical components, such as optical filters and/or optical combiners, are provided at a transmit end of a WDM system. At a receive end of the system, additional components are provided that separate the optical signals according to wavelength and convert the optical signals into corresponding electrical signals. At both transmit and receive ends of the WDM system, equipment may be provided to monitor the power levels of each of the optical signals, for example.

Equipment in both transmit and receives ends of the WDM system often include discrete components, which can introduce additional insertion loss to the WDM signals and can add significantly to the overall cost of the system. There is a need, therefore, for a WDM system having reduced cost and improved performance.

SUMMARY OF THE INVENTION

Consistent with an aspect of the present disclosure an optical device is provided that includes a substrate and an optical demultiplexer, such as a deinterleaver, provided on the substrate. The optical demultiplexer includes a demultiplexer input and a plurality of demultiplexer outputs. The demultiplexer input is configured to receive, as a first WDM signal, a plurality of input optical channels, each of which having a corresponding one of a plurality of wavelengths and being separated from one another by a first wavelength spacing. A first one of the plurality of demultiplexer outputs supplies a first plurality of output optical channels as a second WDM signal. Each of the first plurality of output optical channels is separated from one another by a second wavelength spacing. A second one of the plurality of demultiplexer outputs supplies a second plurality of output optical channels as a third WDM signal. Each of the second plurality of output optical channels is separated from one another by the second wavelength spacing, which is greater than the first wavelength spacing. A first output waveguide is also provided on the substrate and is coupled to the first one of the plurality of demultiplexer outputs to receive a first portion of the second WDM signal. In addition, a second output waveguide is provided on the substrate and is coupled to the first one of the plurality of demultiplexer outputs to receive a second portion of the second WDM signal. The second output waveguide is configured to supply the second portion of the second WDM signal. Further, a photodiode is provided that is configured to receive the second portion of the second WDM signal from the second output waveguide.

Consistent with an additional aspect of the present disclosure, an optical device is provided that includes a substrate and an optical de-interleaver circuit provided on the substrate. The optical deinterleaver circuit includes a deinterleaver input and a plurality of deinterleaver outputs, each of which being configured to supply a corresponding one of a plurality of output optical signals. A first plurality of optical attenuators is also provided on the substrate, each of which being coupled to a corresponding one of the plurality of deinterleaver outputs. The first plurality of optical attenuators is configured to adjust a power level of each of the plurality of output optical signals. In addition, an optical interleaver circuit is provided on the substrate that includes a plurality of interleaver inputs and an interleaver output. Each of the plurality of interleaver inputs is configured to receive a corresponding one of a plurality of input optical signals. Further, a second plurality of optical attenuators is provided on the substrate, each of which being coupled to a corresponding one of the plurality of interleaver inputs. The second plurality of optical attenuators is configured to adjust a power level of each of the plurality of input optical signals.

It is to be understood that both the foregoing general description and the following detailed description are exemplary and explanatory only and are not restrictive of the invention, as claimed.

The accompanying drawings, which are incorporated in and constitute a part of this specification, together with the description, serve to explain the principles of the present disclosure.

DESCRIPTION OF THE EMBODIMENTS

Consistent with the present disclosure optical interleaver and deinterleaver circuits are integrated onto a substrate. The inputs to the interleaver and the outputs of the deinterleaver are each coupled to a corresponding variable optical attenuator (VOA) and optical tap, which are also provided on the substrate. The optical taps supply a portion of the output of each VOA to a corresponding photodetector. A control circuit, which is coupled to the photodetector, in turn, supplies a control signal to each VOA based on the output of the photodetector. Accordingly, optical multiplexing and demultiplexing components, as well as monitoring and power regulating components are provided on the same chip. Such a chip may be compact and relatively inexpensive compared to optical multiplexer and demultiplexer equipment including discrete components.

Reference will now be made in detail to the present exemplary embodiments, which are illustrated in the accompanying drawings. Wherever possible, the same reference numbers will be used throughout the drawings to refer to the same or like parts.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

Figure 1:
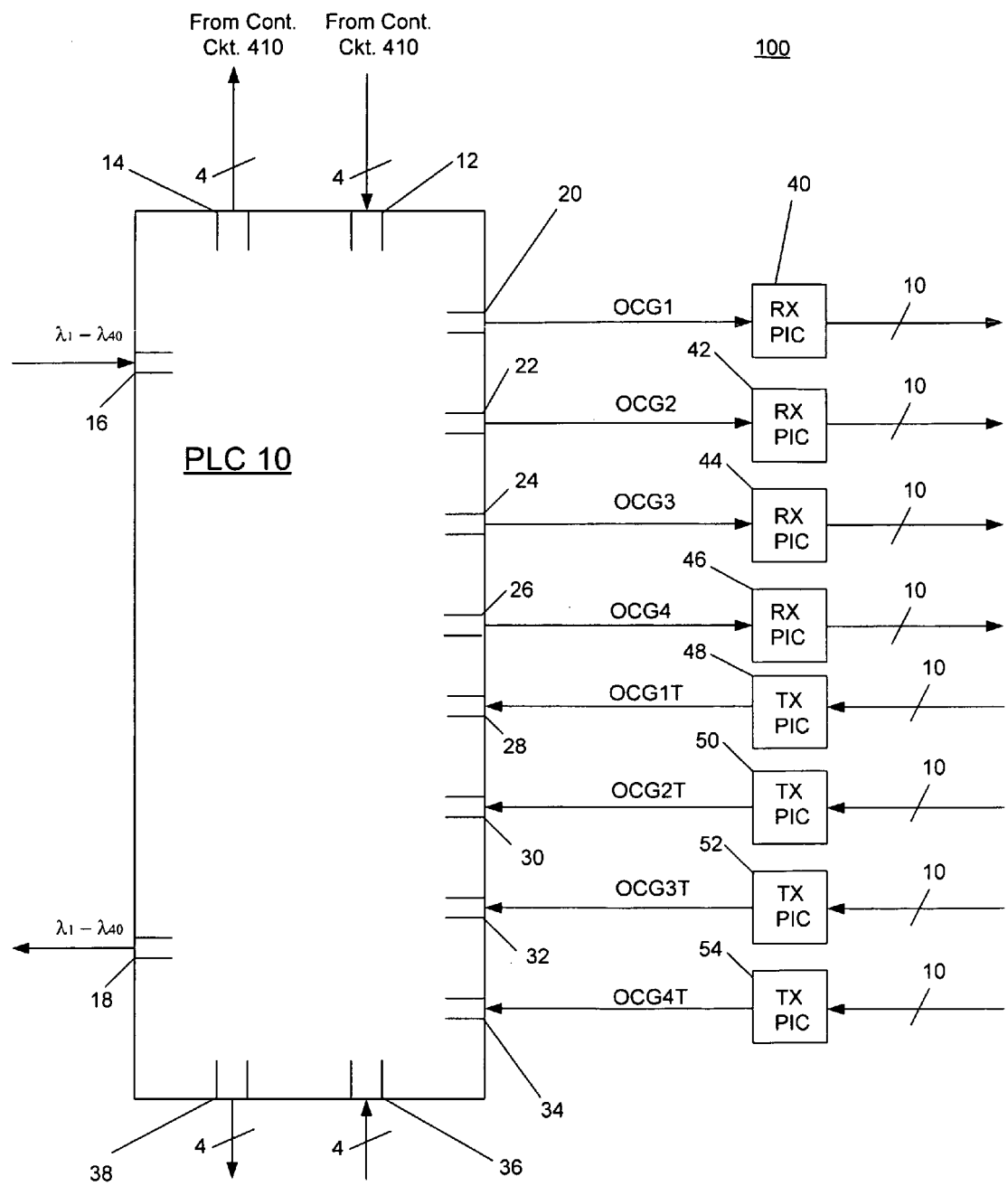
FIG. 1 is a block diagram of an optical module consistent with the present disclosure.

FIG. 1 illustrates an example of an optical module including a planar lightwave circuit (PLC) 10 consistent with an aspect of the present disclosure. In the following discussion, it is understood that the numbers of wavelengths, signals, channels, inputs, outputs, and components are exemplary only and that any appropriate number of these items may be provided in accordance with the present disclosure. PLC 10 receives a WDM signal including input channels having wavelengths of λ1 to λ40, for example, through input port 16. Each of the input channels is spectrally separated from one another by a first channel spacing, e.g., 25 GHz. The channels are demultiplexed within PLC 10 (as discussed in greater detail below) and output as WDM signals OCG1 to OCG 4 through output ports 20, 22, 24, and 26, respectively. Each of optical carrier groups OCG1 to OCG4 includes optical channels separated from on another by a second channel spacing that is greater than the channel spacing associated with the WDM signal input to PLC 10. For example, the channel spacing within each of OCG1 to OCG4 may be 100 GHz. In this example, OCG 1 includes channels λ1, λ5, λ9, λ13, λ17, λ21, λ25, λ29, λ33, and λ37; OCG2 includes channels λ2, λ6, λ10, λ14, λ18, λ22, λ26, λ30, λ34, and λ38; OCG3 includes channels λ3, λ7, λ11, λ15, λ19, λ23, λ27, λ31, λ35, and λ39; and OCG4 includes channels λ4, λ8, λ12, λ16, λ20, λ24, λ28, λ32, λ36, and λ40. Alternatively, the first channel spacing may be 50 GHz and the second channel spacing may be 200 GHz.

OCG1 to OCG4 is supplied to receiver photonic integrated circuits (RX PICs) 40, 42, 44, and 46, respectively. Each of RX PICs 40, 42, 44, and 46 has a structure described in U.S. Pat. No. 7,050,666, the subject matter of which is incorporated herein by reference. RX PIC 40, for example, may include an arrayed waveguide grating (AWG), for example, to separate OCG1 into individual channels, and photodiodes, to convert the separated channels into corresponding electrical signals. Each RXPIC 40, 42, 44, and 46, therefore, outputs 10 electrical signals corresponding to each channel within a received OCG.

As further shown in FIG. 1, four transmitter TX PICs 48, 50, 52, and 54, for example, receive a corresponding group of 10 electrical signals. The TX PICs include 10 lasers and 10 modulators each for generating 10 modulated optical signals (channels), each of which corresponding to a respective one of the input electrical signals. Each of the TX PICs may also include an AWG to multiplex the modulated optical signals into a transmitted or output WDM signal (transmitted optical carrier groups OCG1T to OCG4T), which are then output to corresponding ports 28, 30, 32, and 34. In this example, optical carrier group includes channels λ1, λ5, λ9, λ13, λ17, λ21, λ25, λ29, λ33, and λ37; OCG2T includes channels λ2, λ6, λ10, λ14, λ18, λ22, λ26, λ30, λ34, and λ38; OCG3T includes channels λ3, λ7, λ11, λ15, λ19, λ23, λ27, λ31, λ35, and λ39; and OCG4T includes channels λ4, λ8, λ12, λ16, λ20, λ24, λ28, λ32, λ36, and λ40.

PLC 10 supplies the output WDM signal including OCG1T to OCG4T through port 18. The output WDM signal may include output optical channels having wavelengths λ1 to λ40, as noted above. The TX PIC is also described in U.S. Pat. No. 7,340,122, the contents of which are incorporated herein by reference.

As further shown in FIG. 1, PLC 10 may receive four electrical inputs, for example, through port 14 and four electrical inputs through port 36. PLC 10 may also supply four output electrical signals, for example, through ports 38 and 12, respectively. The electrical input/output signals may be received from/supplied to a control circuit, which is discussed in greater detail below.

Figure 2:
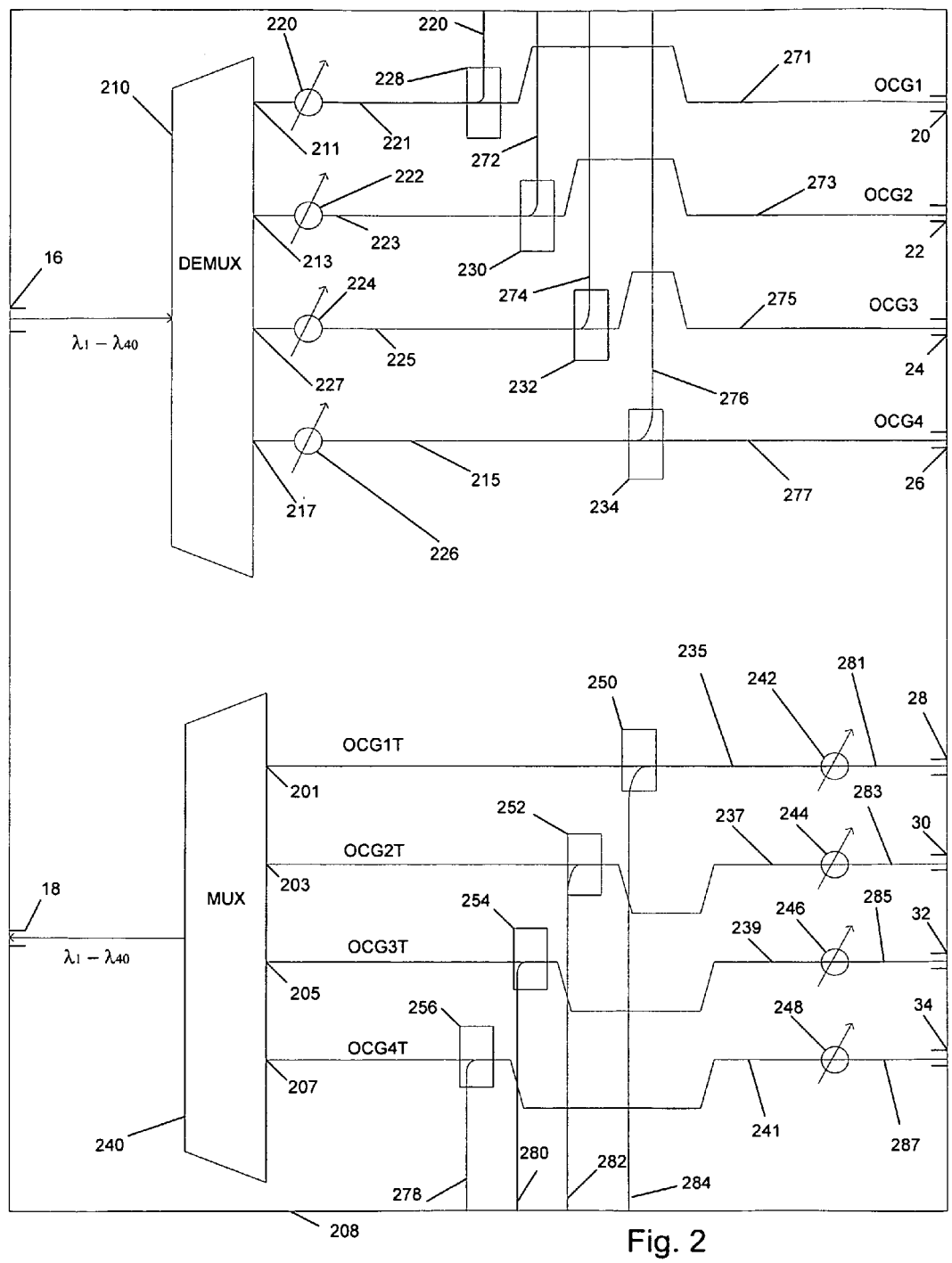
FIG. 2 is a diagram of a planar lightwave circuit (PLC) consistent with an aspect of the present disclosure.

FIG. 2 illustrates PLC 10 in greater detail. PLC 10 includes a substrate 208 upon which an input port 16 is provided. Substrate 208 may include a material selected from silicon, silica, fused quartz, sapphire, glass, gallium-arsenide, silicon-carbide, indium-phosphide, silicon-on-insulator, germanium-on-insulator, and silicon-germanium.

A WDM signal including input optical channels having wavelengths λ1 to λ40 is supplied to optical demultiplexer 210 via input port 16 provided on substrate 208. The channels are then separated by optical demultiplexer 210 into WDM signals or optical carrier groups OCG1 to OCG4, each of which being supplied to a corresponding one of outputs 211, 213, 227, and 217. Each OCG is supplied to a corresponding one of variable optical attenuators (VOAs) 220, 222, 224, and 226, and fed through respective VOA outputs 221, 223, 225, and 227.

The OCGs are next supplied to corresponding optical taps 228, 230, 232, and 234, which power divide each OCG and supply a small portion of each OCG to a corresponding output waveguide 270, 272, 274, and 276. Each tap also supplies a larger portion of each OCG to corresponding output waveguides 271, 273, 275, and 277 and through output ports 20, 22, 24, and 26. Waveguides 270, 272, 274, and 275 may includes a high refractive index material, such as SiOC, as described in U.S. Pat. No. 7,043,133, incorporated herein by reference.

As noted above, transmit OCGs (OCG1T, OCG2T, OCG3T, and OCG4T) are supplied to PLC 10 from TX PICs 48, 50, 52, and 54, respectively. OCG1T, OCG2T, OCG3T, and OCG4T are supplied to corresponding VOAs 242, 244, 246, and 2248 via waveguides 281, 283, 285, and 287. The VOA outputs, in turn, are supplied to corresponding taps, 250, 252, 254, and 256, which supply relatively small portions of each OCG to waveguides 278, 280, 282, and 284, respectively, and the remaining portion of each OCG is supplied to a corresponding one of the waveguide inputs 201, 203, 205, and 207 to multiplexer 240. Each OCG is then combined into a WDM signal including channels having wavelengths λ1 to λ40 and is output through port 18. In addition, each of waveguides 278, 280, 282, 284, 201, 203, 205, and 207 may include the same or similar material as that described above for waveguide 270, for example.

Figure 3:
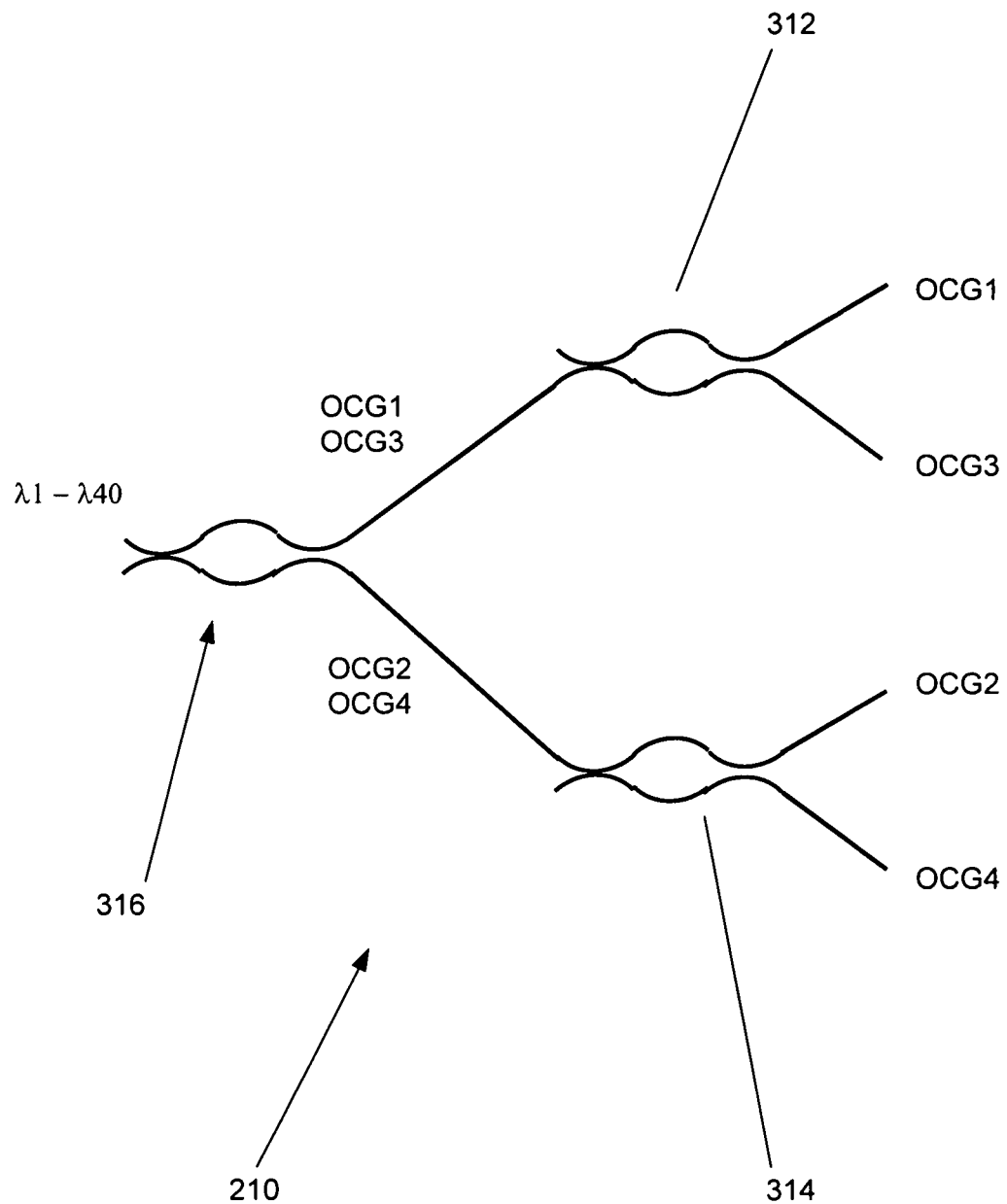
FIG. 3 is a diagram of an example of a demultiplexer consistent with an additional aspect of the present disclosure.

FIG. 3 shows an example in which optical demultiplexer 210 includes an optical de-interleaver circuit including first (310), second (312), and third (314) mach-zender (MZ) interferometers. Channels having wavelengths λ1 to λ40 are supplied to MZ interferometer 310, and a first output of MZ interferometer 310 supplies OCG groups OCG1 and OCG3 in a known manner. In addition, a second output of MZ interferometer 310 supplies optical carrier groups OCG2 and OCG4. OCG1 and OCG3 are, in turn, output to MZ 312, and OCG2 and OCG4 are fed to MZ interferometer 314. Further, MZ interferometer 312 is configured to supply OCG1 and OCG3 at first and second outputs, respectively, and MZ interferometer 314 is configured to supply OCG2 and OCG4 at corresponding outputs, also in a known manner. Preferably, the waveguide material constituting MZ interferometers 310, 312, and 314 includes the same or similar material as that noted above in regard to waveguide 270.

The multiplexer 240 shown in FIG. 2 may have the a similar structure as demultiplexer 210, with the exception that OCG1-OCG4 are supplied as inputs to MZ interfereometers 312 and 314 and are then multiplexed into an output WDM signal supplied from MZ interferometer 310. Alternatively, the multiplexer 240 and demultiplexer 210 may have a structure similar to that described in U.S. patent application Ser. No. 11/966,329 tiled "Performance Compensated Tx/Rx Optical Devices," filed on Dec. 28, 2007, the entire contents of which are incorporated herein by reference.

Figure 4:
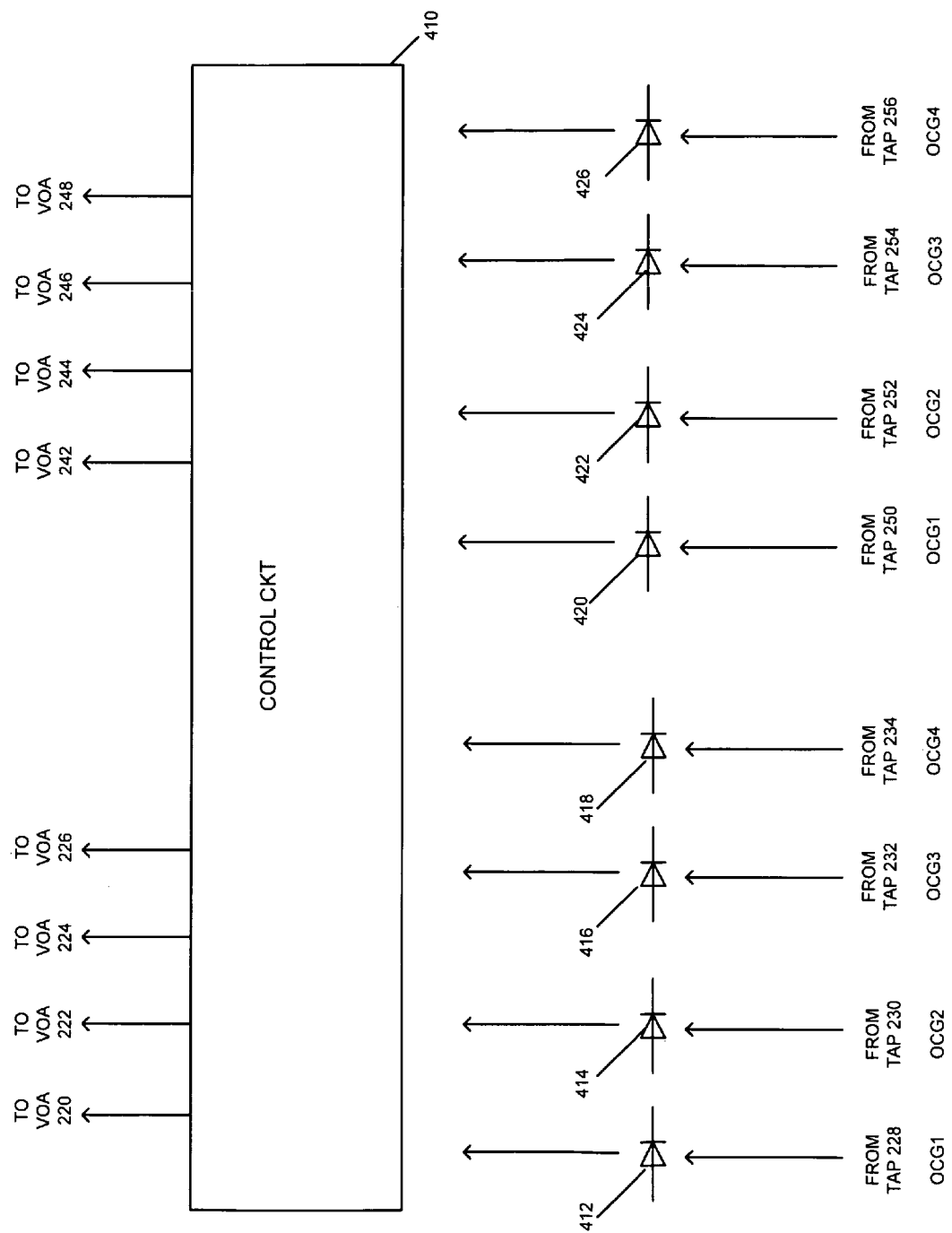
FIG. 4 is a schematic diagram illustrating a control circuit and photodiodes consistent with an additional aspect of the present disclosure.

As noted above, optical 228, 230, 232, 234, 250, 252, 254, and 256 supply relatively small portions of a corresponding OCG from PLC 10. As shown in FIG. 4, these OCG portions, are supplied to corresponding photodiodes 412, 414, 416, 418, 420, 422, 424, and 426, which, in turn, generate respective electrical signals, which are supplied to control circuit 410. Control circuit 410, which may include a microprocessor, for example, or hardwired logic, is configured to determine an optical intensity associated with each sensed OCG (e.g., a sum of the intensity of each channel within an OCG) and compare that intensity with a desired intensity. Based on this comparison, the control circuit outputs control signals to VOAs 220, 222, 224, 226, 242, 244, 246, and 248 to adjust an optical intensity or power of each OCG passing therethrough. Optionally, control circuit 410 may be configured to supply a periodically varying signal having a predetermined frequency to modulate each OCG, e.g., each optical channel with a particular OCG, with an identifying tone, such that the tone for one OCG may be different from that of another OCG. Accordingly, control circuit 410 can determine whether a particular OCG is being supplied through a correct input or is being fed through a correct output. In the event, for example, that OCG1T is improperly detected (by identifying its tone) on waveguide 283 where OCG2T should be, VOA 244 may be controlled to block the incoming signals until the appropriate connections are made and OCG1T is input on waveguide 281.

Figure 5:
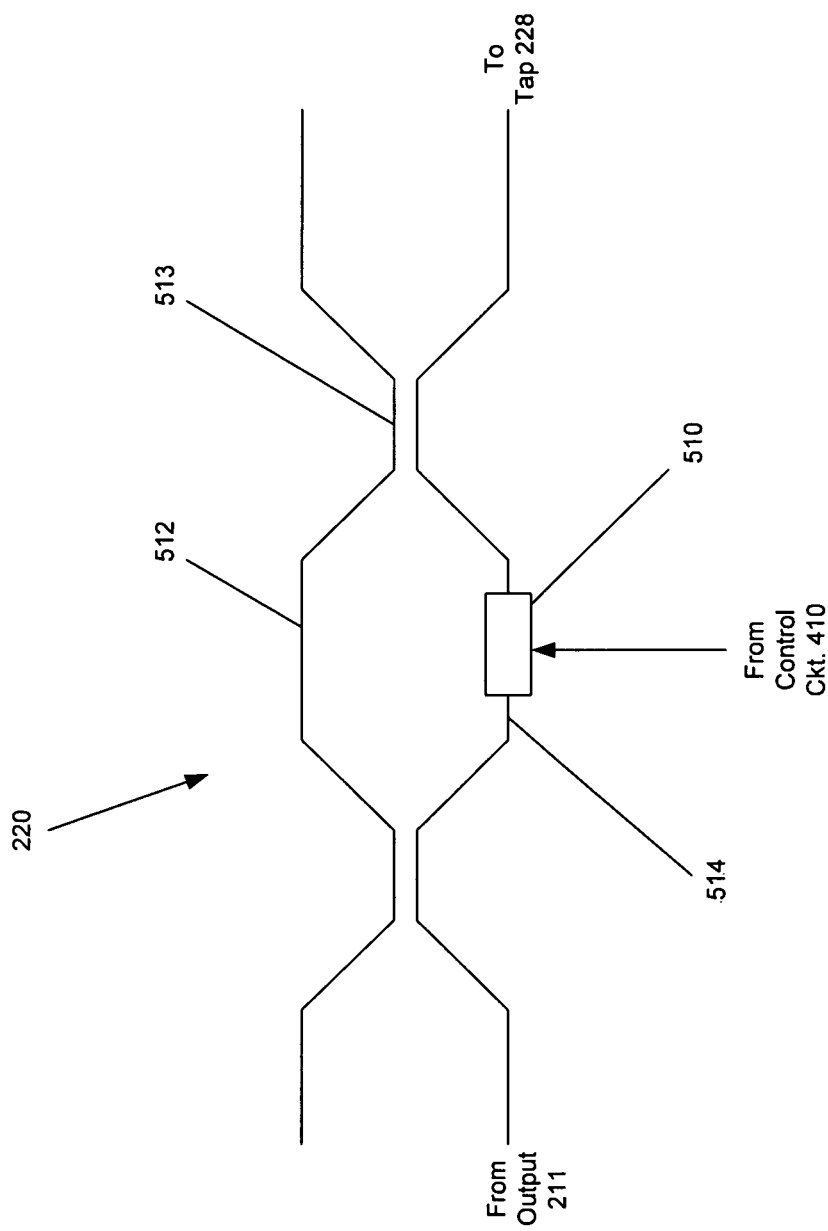
FIG. 5 is a diagram of a variable optical attenuator (VOA) consistent with a further aspect of the present disclosure.

FIG. 5 shows an example of VOA 220 consistent with a further aspect of the present disclosure. Typically, VOA 220 includes an MZ interferometer having first (512) and second (514) waveguide arms. A conventional heater 510 is provided adjacent arm 514 such that, in response to a control signal from circuit 410, the temperature of a portion of arm 514 is changed, and, as a result, the optical path length of an optical signal traveling through this arm is also changed. Accordingly, in coupler region 513, the signal propagating through arms 510 and 512 constructively interfere with on another to a varying degree to thereby change the intensity of the light output from VOA 220.

It is understood, that one or more electrical components may be provided between heater 510 and control circuit 410 to provide appropriate electrical signals to heater 510.

It is noted that PLC 10 may be used in an optical add/drop multiplexer whereby dropped channel are supplied to demultiplexer 210 and then either fed to a corresponding RX PIC or passed through (i.e., bypassing the RX PICs) via a connection through by an optical fiber or other waveguide from an output OCG port (e.g. port 20) of PLC 10 to a corresponding one of input OCG input ports (e.g. port 28) configured to receive an input OCG.

As noted above, the present disclosure provides for an integrated optical circuit having a plurality of components provided therein. As a result, the integrated optical circuit is more reliable, less expensive, and more compact.

Other embodiments of the invention will be apparent to those skilled in the art from consideration of the specification and practice of the invention disclosed herein. It is understood that the number of wavelengths and components, such as VOAs, waveguides, photodiodes, multiplexers, and demultiplexers, discussed above are exemplary only, and that any appropriate number of such wavelengths and components are contemplated as being within the scope of this disclosure. It is intended that the specification and examples be considered as exemplary only, with a true scope and spirit of the invention being indicated by the following claims.

What is claimed is:

1. An optical device, comprising:
a substrate;
an optical demultiplexer provided on the substrate, the optical demultiplexer including a demultiplexer input and a plurality of demultiplexer outputs, the demultiplexer input being configured to receive, as a first WDM signal, a plurality of input optical channels, each of the plurality of input channels having a corresponding one of a plurality of wavelengths and being separated from one another by a first wavelength spacing, a first one of the plurality of demultiplexer outputs supplying a first plurality of output optical channels as a second WDM signal, each of the first plurality of output optical channels being separated from one another by a second wavelength spacing, and a second one of the plurality of demultiplexer outputs supplying a second plurality of output optical channels as a third WDM signal, each of the second plurality of output optical channels being separated from one another by the second wavelength spacing, the second wavelength spacing being greater than the first wavelength spacing;
a first output waveguide provided on the substrate, the first output waveguide being coupled to the first one of the plurality of demultiplexer outputs to receive a first portion of the second WDM signal; and
a second output waveguide provided on the substrate, the second output waveguide being coupled to the first one of the plurality of demultiplexer outputs to receive a second portion of the second WDM signal, the second output waveguide being configured to supply the second portion of the second WDM signal; and
a photodiode configured to receive the second portion of the second WDM signal from the second output waveguide,
wherein the plurality of input optical channels are a plurality of first input optical channels, the optical device further comprising:
an optical multiplexer provided on the substrate, the optical multiplexer having a plurality of multiplexer inputs, each of which being configured to receive a corresponding one of a plurality of groups of second input channels; collectively, said plurality of groups of second inputs channels constituting a fourth WDM signal, the optical multiplexer also having a multiplexer output configured to supply the fourth WDM signal.

2. An optical device in accordance with claim 1, wherein the optical demultiplexer includes an optical deinterleaver.

3. An optical device in accordance with claim 1, wherein the photodiode is provided on the substrate.

4. An optical device in accordance with claim 1, wherein the second WDM signal includes light at each of the plurality of wavelengths.

5. An optical device in accordance with claim 1, wherein the substrate includes a material selected from silicon, silica, fused quartz, sapphire, glass, gallium-arsenide, silicon-carbide, indium-phosphide, silicon-on-insulator, germanium-on-insulator, and silicon-germanium; and the first and second output waveguides include SiOC.

6. An optical device in accordance with claim 1, wherein each second input channel within one of said plurality of groups of second input channels is separated from one another by the second wavelength spacing.

7. An optical device in accordance with claim 1, wherein each second input channel within said fourth WDM signal is separated from one another by the first wavelength spacing.

8. An optical device in accordance with claim 1, further comprising a plurality of optical attenuators, each of which being coupled to a corresponding one of the plurality of demultiplexer outputs.

9. An optical device in accordance with claim 1, further comprising a plurality of optical attenuators, each of which being coupled to a corresponding one of the plurality of multiplexer inputs.

10. An optical device in accordance with claim 1, further comprising:
- a first plurality of optical attenuators, each of which being coupled to a corresponding one of the plurality of demultiplexer outputs; and
- a second plurality of optical attenuators, each of which being coupled to a corresponding one of the plurality of multiplexer inputs.

11. An optical device, comprising:
- a substrate;
- an optical deinterleaver circuit provided on the substrate, the optical deinterleaver circuit including a deinterleaver input and a plurality of deinterleaver outputs, each of the plurality of deinterleaver outputs being configured to supply a corresponding one of a plurality of output optical signals;
- a first plurality of optical attenuators provided on the substrate, each of which being coupled to a corresponding one of the plurality of deinterleaver outputs, the first plurality of optical attenuators being configured to adjust a power level of each of the plurality of output optical signals;
- an optical interleaver circuit provided on the substrate, the optical interleaver circuit including a plurality of interleaver inputs and an interleaver output, each of the plurality of interleaver inputs being configured to receive a corresponding one of a plurality of input optical signals; and
- a second plurality of optical attenuators provided on the substrate, each of which being coupled to a corresponding one of the plurality of interleaver inputs, the second plurality of optical attenuators being configured to adjust a power level of each of the plurality of input optical signals,
- wherein the plurality of output optical signals is a first plurality of output optical signals, each of the first plurality of optical attenuators includes a corresponding one of a plurality of attenuator outputs, the optical device further comprising a plurality of optical taps, each of which being coupled to a corresponding one of the plurality of attenuator outputs and configured to supply a corresponding one of a second plurality of output optical signals, each of the second plurality of optical signals being a portion of a corresponding one of the first plurality of output optical signals,
- wherein the plurality of attenuator outputs is a first plurality of attenuator outputs, and the plurality of optical taps is a first plurality of optical taps, each of the second plurality of optical attenuators including a respective one of a second plurality of attenuator outputs, the optical device further including a second plurality of optical taps, each of which being coupled to a corresponding one of the second plurality of attenuator outputs and configured to supply a corresponding one of a third plurality of output optical signals, each of the third plurality of optical signals being a portion of a corresponding one of the plurality of input optical signals
- wherein an amount of attenuation associated with one of the first plurality of optical attenuators is based on an intensity of one of the second plurality of output optical signals.

12. An optical device in accordance with claim 11, wherein an amount of attenuation associated with one of the first plurality of optical attenuators is based on an intensity of one of the second plurality of output optical signals.

13. An optical device in accordance with claim 11, further comprising:
- a plurality of photodiodes provided on the substrate, each of which being configured to receive a corresponding one of the second plurality of output optical signals.

14. An optical device in accordance with claim 13, wherein the plurality of photodiodes is a first plurality of photodiodes, the optical device further comprising:
- a second plurality of photodiodes provided on the substrate, each of which being configured to receive a corresponding one of the third plurality of output optical signals.

15. An optical device in accordance with claim 11, wherein the substrate includes a material selected from silicon, silica, fused quartz, sapphire, glass, gallium-arsenide, silicon-carbide, indium-phosphide, silicon-on-insulator, germanium-on-insulator, and silicon-germanium.

* * * * *